US011498278B2

(12) United States Patent
Alvarez et al.

(10) Patent No.: US 11,498,278 B2
(45) Date of Patent: Nov. 15, 2022

(54) PRINTHEAD PURGE TRAY

(71) Applicant: HEWLETT-PACKARD DEVELOPMENT COMPANY, L.P., Houston, TX (US)

(72) Inventors: Miguel Alvarez, Vancouver, WA (US); Warren Scott Martin, Vancouver, WA (US); Joshua Schmale, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1064 days.

(21) Appl. No.: 16/075,328

(22) PCT Filed: Apr. 17, 2017

(86) PCT No.: PCT/US2017/027867
§ 371 (c)(1),
(2) Date: Aug. 3, 2018

(87) PCT Pub. No.: WO2018/194539
PCT Pub. Date: Oct. 25, 2018

(65) Prior Publication Data
US 2021/0197474 A1  Jul. 1, 2021

(51) Int. Cl.
*B29C 64/35* (2017.01)
*B33Y 30/00* (2015.01)
*B33Y 40/00* (2020.01)
*B33Y 50/02* (2015.01)
*B29C 64/209* (2017.01)
*B29C 64/393* (2017.01)

(52) U.S. Cl.
CPC ............ *B29C 64/35* (2017.08); *B29C 64/209* (2017.08); *B29C 64/393* (2017.08); *B33Y 30/00* (2014.12); *B33Y 40/00* (2014.12); *B33Y 50/02* (2014.12)

(58) Field of Classification Search
CPC ..... B29C 64/209; B29C 64/35; B29C 64/245; B29C 64/393; B33Y 40/00; B33Y 30/00; B33Y 50/02
See application file for complete search history.

(56) References Cited

U.S. PATENT DOCUMENTS

| 2008/0241404 A1 | 10/2008 | Allaman et al. |
| 2013/0010036 A1 | 1/2013 | Conner et al. |
| 2013/0052291 A1 | 2/2013 | Morikawa |
| (Continued) |

FOREIGN PATENT DOCUMENTS

| EP | 2572865 A1 | 3/2013 |
| WO | 2016143942 A1 | 9/2016 |

OTHER PUBLICATIONS

"Purging a Desktop Epson Printer with Sponge Filled Cartridges", Retrieved from Internet: https://www.inksupply.com/purging.cfm, 2017, 7 pages.

*Primary Examiner* — Philip C Tucker
*Assistant Examiner* — Evan T Hulting
(74) *Attorney, Agent, or Firm* — Fabian VanCott

(57) ABSTRACT

A three dimensional printing system, the system including: a printhead; and a removable tray comprising a reservoir, the tray located in a print bed of the three dimensional printing system such that liquid purged from the printhead is deposited in the reservoir, wherein prior to the system purging liquid from the printhead, the system confirms that the tray is in place using a sensor.

19 Claims, 9 Drawing Sheets

(56) References Cited

U.S. PATENT DOCUMENTS

| | | |
|---|---|---|
| 2013/0141491 A1 | 6/2013 | Krichtman et al. |
| 2015/0041616 A1* | 2/2015 | Gentile ............... G06Q 10/087 248/550 |
| 2016/0096328 A1 | 4/2016 | Ruiz et al. |
| 2017/0100899 A1 | 4/2017 | El-Siblani et al. |

* cited by examiner

PRINTHEAD PURGE TRAY

BACKGROUND

This disclosure relates to removing liquid from a printhead. The method may be applied to a printbar comprising a plurality of printheads.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
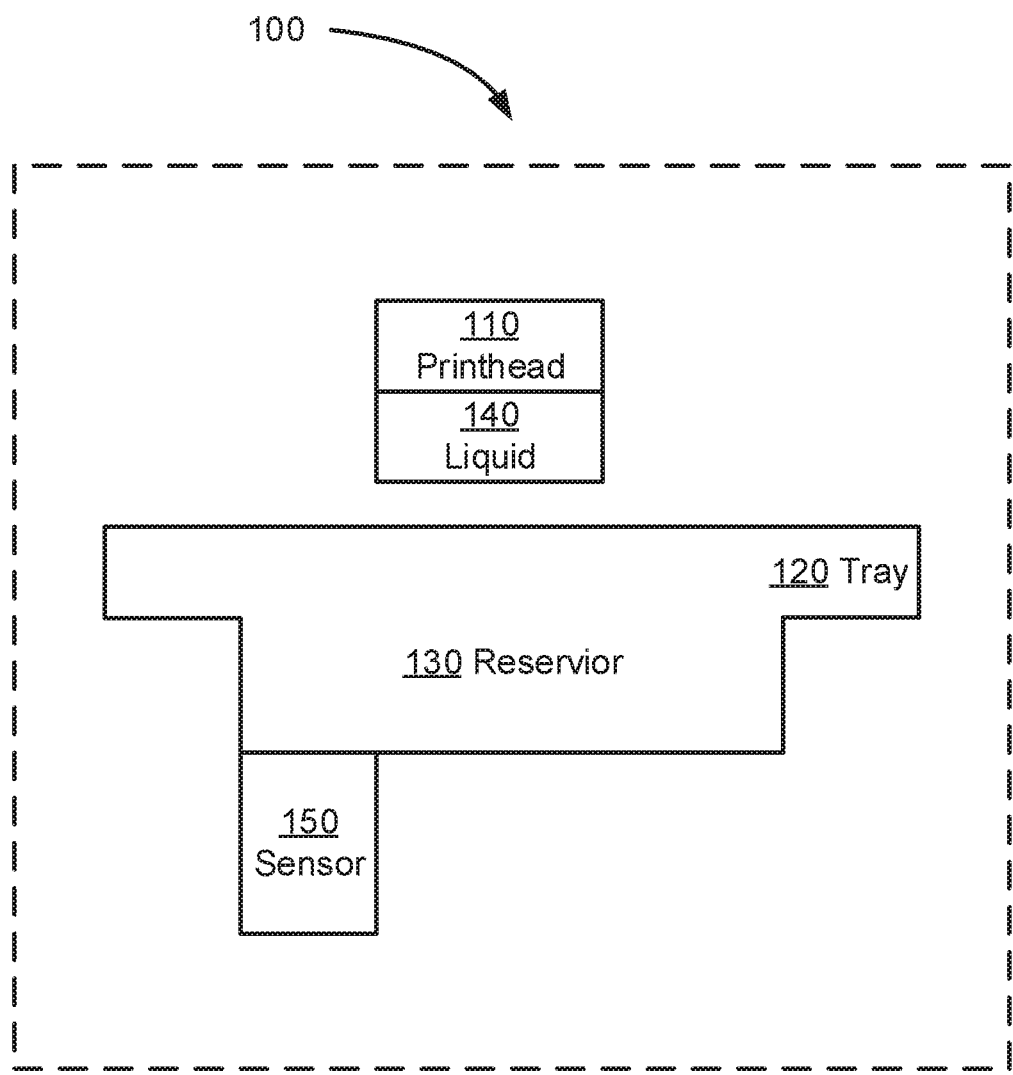
FIG. 1 is a diagram of a three dimensional printing system according to an example of the principles described herein

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Printheads and printbars (collections of printheads) may need to be purged of liquid as part of maintenance and/or installation procedures. Purging liquid from printheads may consume system resources that are more economically used to handle waste and support operations of the printhead.

This specification discloses the use of a temporary tray, including a reservoir, which is placable underneath the printhead to receive the purged liquid. The tray may then be removed and disposed. This way the purged liquid does not burden the operation of the system and does not have to be stored with the printer after the purging operation.

Printheads and printbars (collections of printheads) may be filled with shipping liquid after manufacturing and prior to use. Shipping liquid is generally inert and more stable than printing liquid. Shipping liquid keeps the channels and reservoirs of the printbar wetted out, facilitating loading of the printhead with printing liquid. Shipping liquid may be more stable than a printing liquid.

As part of preparing a printhead filled with shipping liquid for use, the shipping liquid is expelled and replaced with printing liquid. The printing liquid may be an ink. The printing liquid may be a three dimensional printing liquid. The printing liquid may be a build material. The printing liquid may be an active agent. The printing liquid may be a mask material.

Disposing of the shipping liquid often uses additional components and capabilities in a system that are not used for other purposes. For example, if the shipping liquid is retained by the system, the system will need additional waste storage capacity to hold the used shipping liquid. In some examples, media, web, cleaning liquid, and other resources will be consumed as part of expelling the shipping liquid from a printhead.

Other printing liquids may need to be purged from a printhead. For example, a changeout in materials being used in the three dimensional printing process may induce a changeout in the printing liquid in a printhead. Purging of liquid may be performed on a printhead that has been allowed to sit unused for a period of time.

Among other examples, the specification and figures describe a three dimensional printing system, the system including: a printhead; and a removable tray comprising a reservoir, the tray located in a print bed of the three dimensional printing system such that liquid purged from the printhead is deposited in the reservoir, wherein prior to the system purging liquid from the printhead, the system confirms that the tray is in place using a sensor.

This specification also describes a tray to capture and dispose of purged liquid, the tray including: a reservoir to receive purged liquid from an installed printhead, and absorbent material in the reservoir, wherein the tray removably attaches in a printing area of a three dimensional printing system such that the tray is within 1.0 cm of an ejector of the printhead.

This specification also describes a method of servicing a printhead, the method including: installing a tray with a reservoir on a printing system; purging liquid from a printhead directly into the reservoir; and removing the tray from the printing system.

This specification describes a three dimensional printing system, the system including: a build unit; a printhead, the printhead comprising a purgeable liquid and the printhead positioned so that ejected liquid from the printhead is deposited on the build unit; a sensor, the sensor to detect placement of a tray in the build unit; a controller, wherein the controller: detects placement of the tray the build unit using the sensor; and when the tray is positioned to receive liquid ejected from the printhead, the controller causes the printhead to purge liquid from the printhead.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may or may not be included in other examples.

Turning now to the figures, FIG. 1 is a diagram of a three dimensional printing system (100) according to an example of the principles described in this specification. The system (100) includes: a printhead (110); and a removable tray (120) comprising a reservoir (130), the tray (120) located in a print bed of the three dimensional printing system (100) such that liquid (140) purged from the printhead (110) is deposited in the reservoir (130), wherein prior to the system (100) purging liquid (140) from the printhead (110), the system (100) confirms that the tray (120) is in place using a sensor (150).

The system (100) is a three dimensional printing system (100) according to an example of the principles described herein. Liquid (140) may be used to protect a printhead (110) during shipping. Liquid (140) may also be used in a printbar which includes multiple printheads (110). Three dimensional printing systems, sometimes called as forming systems, are used to create solid components. A wide variety of such systems (100) exist and they use a variety of different techniques and materials to form components. In some examples, material is provided and then connected together using material ejected from a printhead (110). In other examples, a printhead (110) may be used to apply an active agent and/or a mask material. The printhead (110) may be used to apply all the material, ejecting each bit of the solid component, drop by drop to build up the desired figure. Secondary processes, including heating, sintering, cooling, radiation exposure, mechanical operations, and others may be included.

For purposes of this specification and the associated claims, however, a three dimensional printing system includes a printhead (110) that is used to apply a liquid during the printing of a component. The systems (100) and approaches described may be readily applied to a wide variety of printing technologies, Printing as used in this specification includes forming, as in the forming of three dimensional parts.

The printhead (110) contains liquid (140). The liquid (140) may be purged as part of preparing the printhead (110) for operation. Other approaches have used waste collection and storage for the system to contain waste liquid (140). However, this has the downside of using relatively expensive system storage/containment resources. Using the system resources to manage liquid (140) may also result in additional components being incorporated into the system, for example, a vacuum line to reduce microdroplets and volatiles from contaminating the system. Some liquids (140), such as shipping liquids, may have low surface energy and are difficult to contain in a storage area over longer time frames.

The tray (120) includes a reservoir (130). The tray (120) is a removable tray (120) that is placed in the print bed of the system (100). The tray (120) captures the purged liquid (140). The tray (120) may then be removed and disposed. Because the tray (120) is installed temporarily, the tray (120) may be placed in the print bed (and/or forming area) without inhibiting functionality of the system (100) as the tray (120) may be removed prior to part printing. In some examples, initial portions of the replacement liquid also captured by the tray (120) as part of filling the printhead and/or reservoirs to prepare the printhead (140) and system (100) for operation.

The tray (120) may include features to stabilize the tray (120) with respect to the printhead (140). For example, the tray may include bumps, divots, ridges, groves, etc. to align the tray (120) and/or stabilize the tray (120). In some examples, the tray (120) may be used with a variety of different system (100) designs. The tray (120) may have an adaptor that facilitates placement of the tray (120). The use of an adaptor may allow a single tray design to function with a variety for system (100) designs.

The tray (120) may be placed close to an ejector of the printhead (140). Placing the tray (120) close to the printhead (110) increases capture of micro droplets and volatiles created when liquid (140) is expelled from the printhead (110). Placing the tray (120) close to the printhead (110) helps reduce the quantity of micro droplets and volatiles escaping into the environment and/or contaminating the system (100). In some examples, the tray (120) is placed within 1.0 cm of an ejector on the printhead (110). The tray (120) may be place within 5 mm of an ejector on the printhead (110). The tray (120) may be placed within 2 mm of an ejector on the printhead (110).

The reservoir (130) is located in the tray (120). The reservoir (130) serves to store the purged liquid (140). The reservoir (130) contains volume to be filled with the purged liquid (140). The reservoir may contain enough volume to support purging of multiple printheads (110). For example, the reservoir may be sized to accommodate all the liquid (140) contained in two printbars, each printbar containing multiple printheads (110). In some examples, the reservoir (130) accommodates six printheads (110) of printing liquid (140). The reservoir (130) may have a capacity of 400 milliliters (ml). The reservoir (130) may have a capacity of 500 ml. The reservoir (130) may have a capacity of 600 ml. The reservoir (130) may have a capacity of one liter.

The reservoir (130) may include mechanical features to help contain the shipping liquid and/or reduce the amount of liquid (140) that escapes into the environment and/or contaminates the system (100). The reservoir (130) may include features designed to increase the surface area of the reservoir (130). These may include: groves, filaments, ridges, protrusions, etc. In some examples, the reservoir contains a mesh, sponge, and/or similar high porosity and high surface area material.

The reservoir (130) may contain absorbent material. The absorbent material may aid in capturing and sequestering the ejected shipping liquid. The absorbent material may be connected to the reservoir (130), for example the absorbent material may be mechanically connected to the reservoir (130). The absorbent material may be connected to the tray (120). The absorbent material may include fibrous material. The absorbent material may include porous material. The absorbent material may be a gauze pad. The absorbent material may be composed of filaments, for example, cotton fibers. The absorbent material may be a sponge. In some examples, the absorbent material increases containment by the tray (120) of purged liquid (140) from the printhead (110).

The liquid (140) may be a shipping liquid. The liquid (140) is used to protect a printhead (110) during shipping and/or installation. The liquid (140) may increase the shelf life of the printhead (110) compared with a printhead filled with a printing liquid. The shipping liquid may keep the interior surfaces of the printhead wet, facilitating filling of the printhead without gas bubbles. The liquid (140) may have a low volatility, helping keep a packaged printhead (110) stable. The liquid (140) may be relatively inert and/or non-corrosive.

In some examples, the liquid (140) includes mineral oil. The liquid (140) may contain a silicone oil. The liquid (140) may contain surfactants and/or polymers to reduce the liquid volatility. In some examples, the shipping liquid is substantially free of water, i.e., contains just a trace amount of water, for example, atmospherically absorbed water. The shipping liquid may comprise water and an osmotic agent to reduce corrosiveness, for example, the corrosive behavior observed in deionized and/or distilled water.

The liquid (140) is removed prior to use of the printhead (110). Instead of expelling the liquid (140) into a storage reservoir in the system (100) and/or consuming consumables such as web, media, and/or similar components, the liquid (140) is expelled into the tray (120), specifically into the reservoir (130) in the tray (120). The ability to place the tray directly in the print bed of the system (100) allows a way to capture the liquid (140) without the liquid (140) contacting and/or contaminating other portions of the system (100).

The ability to expel the liquid (140) into the tray (120) avoids storing the purged liquid (140) in the system (100) long term. Use of the tray (120) also reduces and/or prevents the use of other system specific resources that would need to be replaced, e.g., web, cleaning materials, water storage.

The purged liquid (140) may be any liquid stored in the printhead (110). The purged liquid (140) may be an ink. The purged liquid (140) may be an activator. The purged liquid (140) may be a printing liquid. The purged liquid (140) may be a masking liquid. The purged liquid (140) may be a shipping liquid. The purged liquid (140) may be an additive manufacturing liquid. The purged liquid (140) may be a cleaning liquid.

The sensor (150) detects placement of the tray (120) in the system (100). The sensor (150) serves to protect the system (100) from discharging the liquid (140) when a tray (120) is not in place to receive the liquid (140). If the system (100) were to discharge the liquid (140) without the tray (120) in place, there may be multiple potential negative consequences. The liquid may contaminate and/or damage portions of the system (100) located underneath the printbar (110). The liquid (140) may have a low volatility meaning that the liquid (140) may take a long time to evaporate out from the any impacted components. When ejected, the liquid (140) may have a portion of the liquid volatilize and get into the atmosphere. Placement of the tray (120) close to the ejector(s) on the printbar (110) helps contain the purged liquid (140) and reduce the amount of volatilized liquid (140). Containment of the liquid (140) may allow the system (100) to avoid needing a vacuum line and/or similar measures.

The sensor (150) may be a pressure sensor. The tray (120) may obstruct and/or block an opening supplying a flow path past the pressure sensor. Changes in the pressure may be correlated with different configurations of the tray (120). In some examples, the system detects placement of an adaptor in the print bed and subsequently detects placement of the tray on the adaptor using two different changes in pressure detected by a common pressure sensor. In some examples, the pressure sensor monitors air flow from a number of different openings and changes in the airflow may be correlated with a coverage percentage of the openings.

The use of a pressure sensor as the sensor (150) may be advantageous, for example the pressure sensor may have other uses during operation of the system (100). This avoids a dedicated sensor (150) that is used strictly for the liquid purging operations. Other types of sensors (150) may also have multiple uses in addition to the verifying placement of the tray (120) in a print bed to receive ejected printing liquid (140). In some examples, a camera and/or an optical sensor detects placement of the tray. The tray (120) may include a symbol and/or pattern used to confirm the tray (120) is intended to receive the expelled liquid (140). In some examples, the symbol is a trademark.

The sensor (150) may be a contact sensor, a proximity sensor, a conductivity sensor, a pressure sensor, a flow sensor, a switch, an electrical contact, an optical sensor, and/or other sensors. Considerations including cost, robustness, and/or other uses for the sensor (150) may impact the selection of a specific type of sensor (150) for a particulate system (100).

In some examples, the system 100) checks that the sensor (150) is activated, i.e. the tray (120) be in place and/or static, for a given amount of time prior to ejecting the shipping liquid. This may avoid the system (100) discharging the shipping liquid while installing the tray (120) below the printhead (110). For example, the system may check that the tray (120) is in place and a field of view of a camera remains static for 1 minute prior to ejecting liquid (140).

The sensor (150) may be an inline element during ejection of the liquid (140) such that removal of the tray (120) causes the sensor (150) transition to a second state, halting operations. This may avoid accidents when a tray (120) is removed prior to purging all the liquid (140) in the printhead (110).

Figure 2:
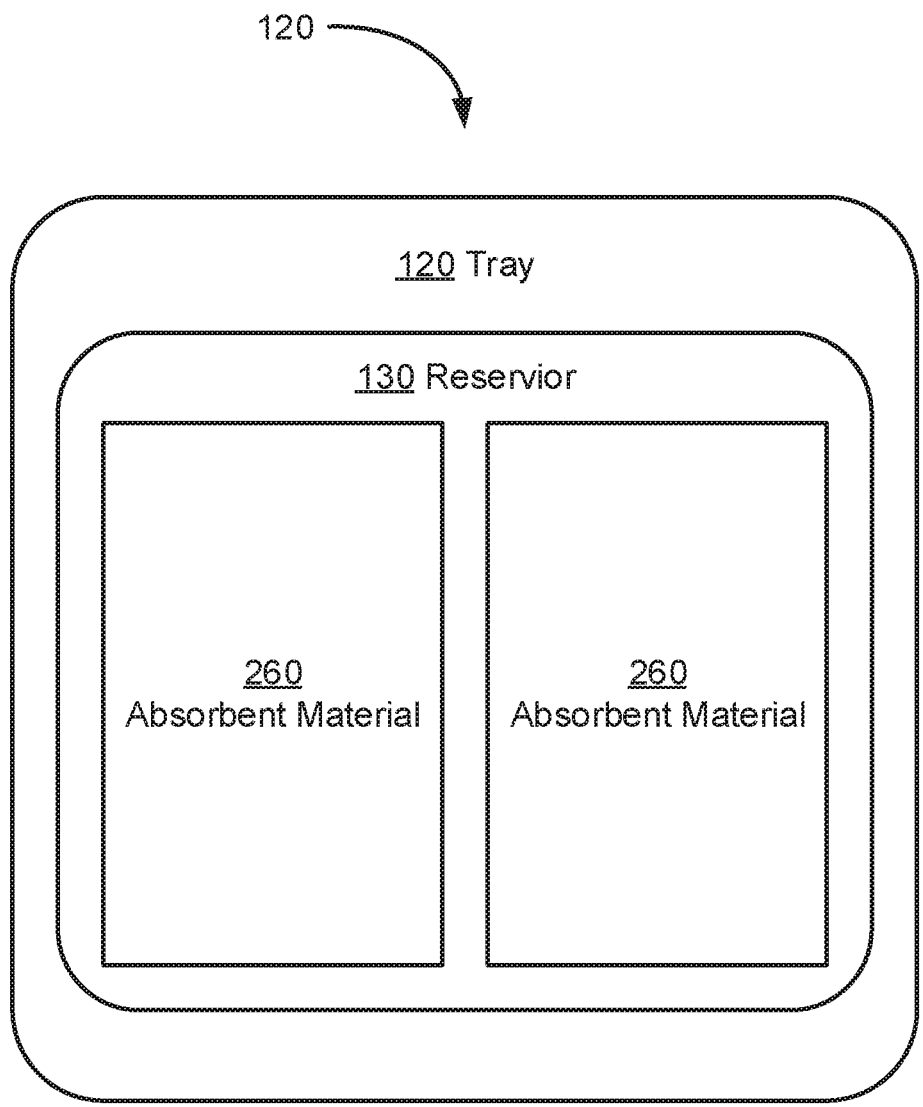
FIG. 2 is a diagram of a tray to capture and dispose of purged liquid according to an example of the principles described herein.

FIG. 2 is a diagram of a tray (120) to capture and dispose of purged liquid (140) according to an example of the principles described herein. The tray (120) includes: a reservoir (130) to receive purged liquid (140) from an installed printhead (110), and absorbent material (260) in the reservoir (130), wherein the tray (120) removably attaches in a printing area of a three dimensional printing system (100) such that the tray (120) is within 1.0 cm of an ejector of the printhead (110).

The tray (120) is placed under the printhead (140). The printhead (110) may then be purged of liquid (140) into the tray (120). The printhead (110) may be filled with a replacement liquid (140). In some examples, a portion of the replacement liquid (140) is purged into the tray (120) to clear out all the original liquid (140) and/or to verify that the printhead (110) is working as intended with the replacement liquid (140). For example, a color test may be performed, a spot size check may be performed, a test pattern may be printed, etc. The tray (120) is then removed and the purged liquid (140) is properly disposed. This avoids using cleaning components of the system (100) and/or storing the waste liquid (140) in the system.

Placing the tray near the printhead (140) also reduces the amount of liquid (140) that evaporates, volatilizes, and/or otherwise escapes into the environment and/or system (100). The use of an absorbent material (260) may further increase the capture rate of expelled liquid (140). These features may allow a system to avoid additional components for secondary measures to limit liquid (140) loss to the environment.

The absorbent material (260) may increase the capture of ejected liquid (140) from the printhead (110). In some examples, the absorbent material captures microdroplets and/or volatilized liquid due to a chemical affinity for the liquid (140). The absorbent material (260) may have a high surface area per unit of volume. This make encourage droplets of ejected liquid (140) to stay in the absorbent material (260), for example, by wicking into the absorbent material (260). In some examples, the absorbent material (260) is a gauze pad that is secured to an interior surface of the reservoir (130). The absorbent material (260) may be mechanically connected to the tray (120). The absorbent material (260) may be glued to the tray (120). The absorbent material (260) may be mechanically intertwined around mechanical elements of the tray (120) such as ribs, protrusions, posts, bars, etc.

In some examples, the reservoir (130) is has sufficient volume to contain the liquid (140) in two filled printbars, where each printbar includes multiple printheads. The tray (120) may include multiple reservoirs (120) for use with different purged liquids (140). For example, the tray (120) may include a first reservoir (130) for a shipping liquid and a second reservoir (130) for a cleaning liquid. The two reservoirs (130) may be exchanged by rotating the tray 180 degrees on the printbed and/or adaptor.

The tray (120) may use an adaptor to attach to a system (100). In some examples, the tray (120) uses different adaptors for different types of systems (100). The tray (120) may work with a first system (100) without an adaptor and use an adaptor for a second system (100). The adaptor may help position the tray (120) close to the printhead (110), for example, within 1.0 cm of an ejector of the printhead (110).

Figure 3:
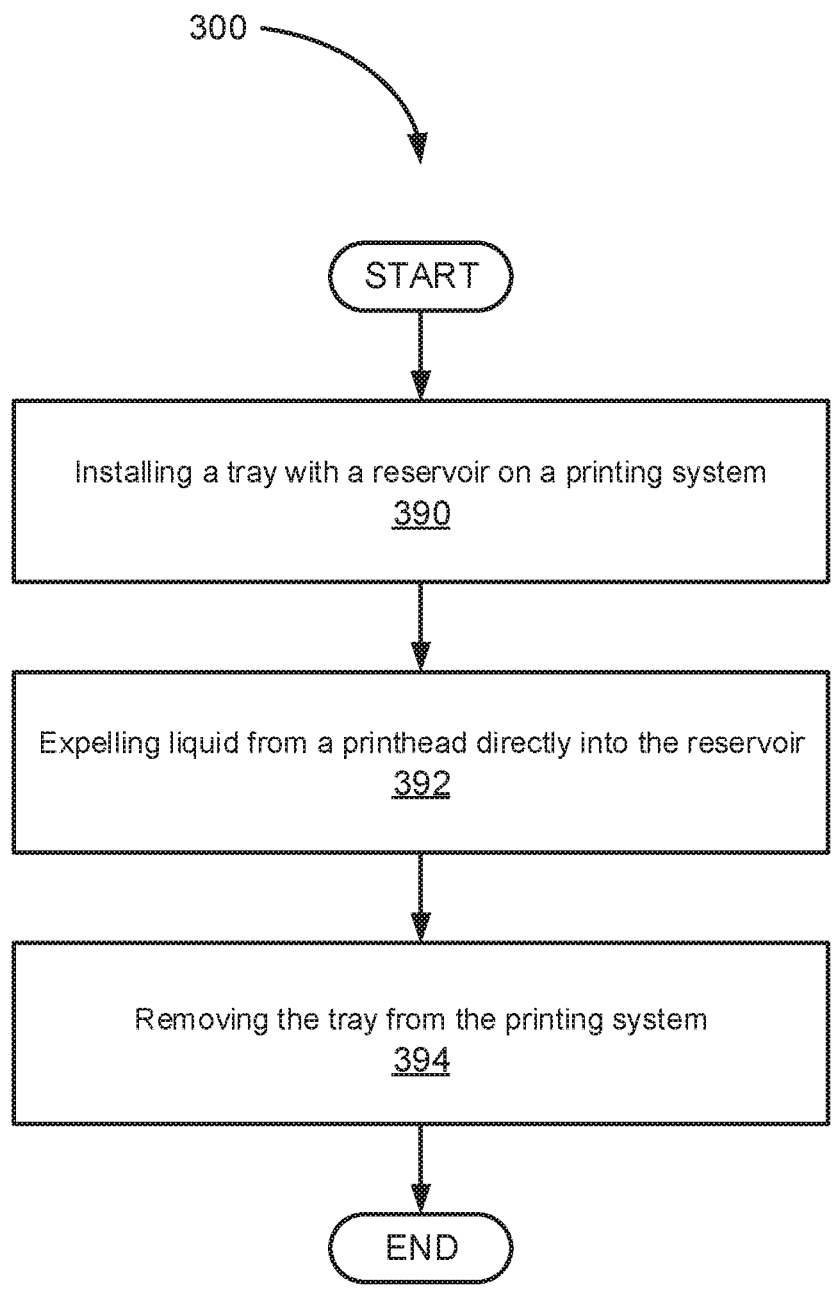
FIG. 3 shows a flowchart of a method of servicing a printhead according to one example.

FIG. 3 shows a flowchart of a method (300) of servicing a printhead (110). The method (300) includes: installing a tray (120) with a reservoir (130) on a printing system (100) (390); purging liquid (140) from a printhead (110) directly into the reservoir (130) (392); and removing the tray (120) from the printing system (100) (394).

The method (300) includes installing a tray (120) with a reservoir (130) on a printing system (100) (390). The tray (120) may be installed in the printing bed of the system (100). The tray (120) is positioned such that when the printhead (110) expels liquid (140) from the printhead (110), the liquid (140) is captured in the reservoir (130). The tray (120) may be located close to the printhead (110) to increase the amount of liquid (140) captured.

Installing a tray (120) should be understood broadly. Because the tray (120) is a temporary part of the system (100), there may be no need for permanent connections between the tray (120) and the system (100). In some examples, the tray (120) includes mechanical features to align the tray (120) in the proper position. Such mechanical features may include holes, pins, groves, ridges, divots, bumps, and similar mechanical features to guide the tray (120) to the desired location. The tray (120) and/or the system (100) may include marking, patterning, text, arrows, indicators, and/or similar aids to help is placing the tray (120) in the proper location on the system (100).

In some examples, a latch, tab, clip, and/or similar element may be used to secure the tray (120) at the desired location. The tray (120) may seal an air intake and the resulting pressure difference across the tray (120) may help hold the tray (120) in place. The tray (120) may be held in place by gravity and/or friction. The tray (120) may be installed under the printhead (110). The tray (120) may be installed and then the printhead (110) moved into position over the tray (120).

The method (300) includes purging liquid (140) from a printhead (110) directly into the reservoir (130) (392). In some examples, the reservoir (130) includes elements designed to capture and/or retain the ejected liquid (140). For example, the use a relatively soft absorbent material (compared to the tray material) to receive the ejected liquid (140) may reduce splashing and volatilization. The use of an overhanging edge on the opening of the reservoir (130) may reduce volatilization of the liquid (140). In some examples, the tray (120) is installed sufficiently close to an ejector of the printbar so as to reduce volatilization of the shipping liquid by at least 80%. The tray (120) may be placed within 1.0 cm of the printhead (110). The tray (120) may be placed within 5 mm of the printhead (110). The tray (120) may be placed within 2 mm of the printhead (110).

Purging liquid (140) is distinct from using the liquid (140) for a build and/or similar functional purpose in the tray (120). Purged liquid (140) is expelled from the printhead (110) and treated as waste rather than performing some useful function on the tray (120) and/or reservoir.

The method (300) includes removing the tray (120) from the printing system (100) (394). The tray (120) may be removed prior to printing with the printhead (110). The tray (120) may be used to capture some of the printing liquid when filling the printhead (110). The tray (120) may include targets, features, grids, and/or similar elements that are useful in preparing a newly filled printhead (110) for operation. For example, the tray (120) may include a test pattern template and an ejected droplet size verification scale to allow for verification that a printheads is properly filled and ready for operation after being filled with printing liquid.

The method (300) may further include disposing of the tray (120) with the printing liquid (140) in the reservoir (130). In some examples, the tray (120) is placed in a provided sealable bag to contain the liquid (140). The tray (120) may include a cover to place over the reservoir (130) and contain the liquid (140).

Figure 4:
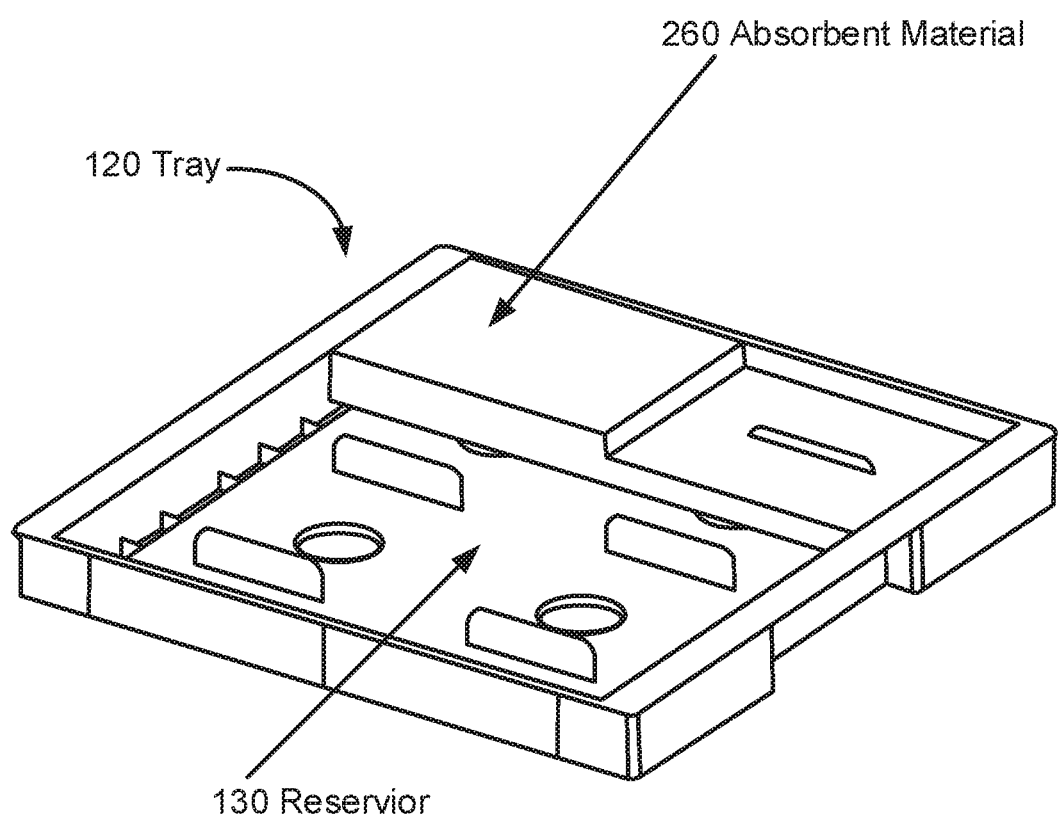
FIG. 4 is a perspective view of a tray according to an example of the principles described herein.

The method (300) may further include transferring the purged liquid to another container and recycling/reusing the tray (120). The method (300) may further include recycling the ejected liquid (140). The method (300) may further include returning the tray (120) with the liquid (140) to a supplier for processing. The method (300) may further include heating and/or reacting the tray (120) to solidify, polymerize, contain, vitrify, and/or otherwise stabilize the liquid (140), FIG. 4 is a perspective view of a tray (120) according to an example of the principles described herein. The tray (120) contains a reservoir (130), the reservoir contains absorbent material (260). The absorbent material (260) is attached to the reservoir (130) with mechanical features. In FIG. 4, the mechanical features include a number of ribs which extend up from the bottom of the reservoir (130). The mechanical features may interact with the absorbent material (260), for example, a pad of absorbent material (260) may slip over the rib to secure the pad of absorbent material (260) in place.

Figure 5:
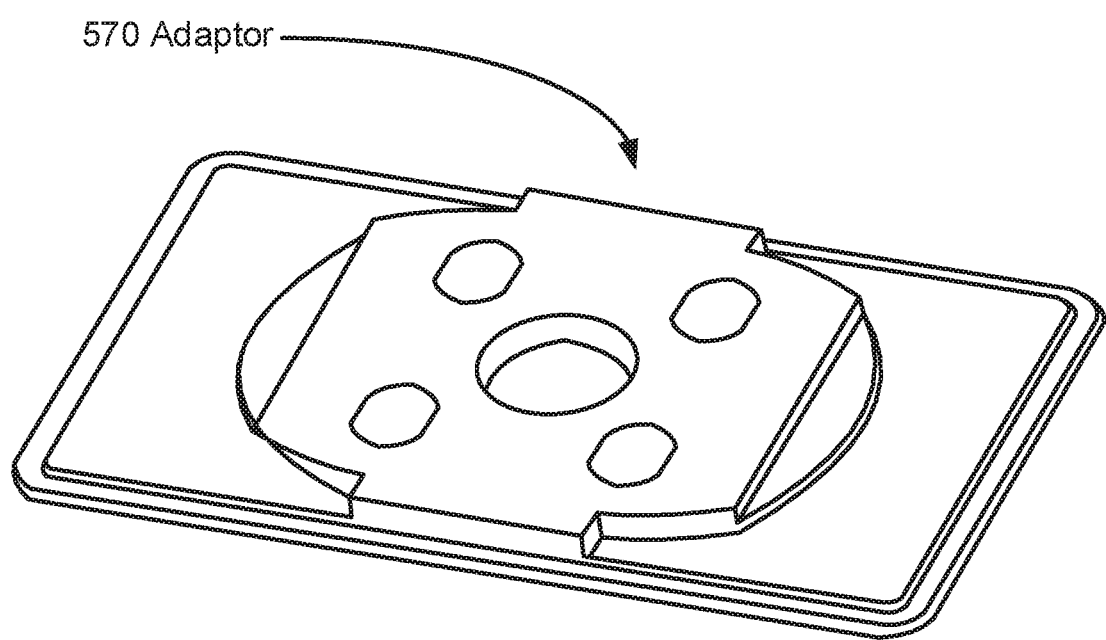
FIG. 5 is a perspective view of an adaptor according to an example of the principles described herein

FIG. 5 is a perspective view of an adaptor (570) according to an example of the principles described herein. The adaptor (570) includes mechanical features to interact with and/or stabilize the tray (120) in the proper position. The version of the adaptor (570) shown, has a number of holes that are obstructed by the tray (120) this allows a pressure sensor downstream of the holes to detect the obstruction by the tray (120) and recognize that the tray (120) and adaptor (570) are in place and blocking an airflow path to the sensor (150).

Figure 6:
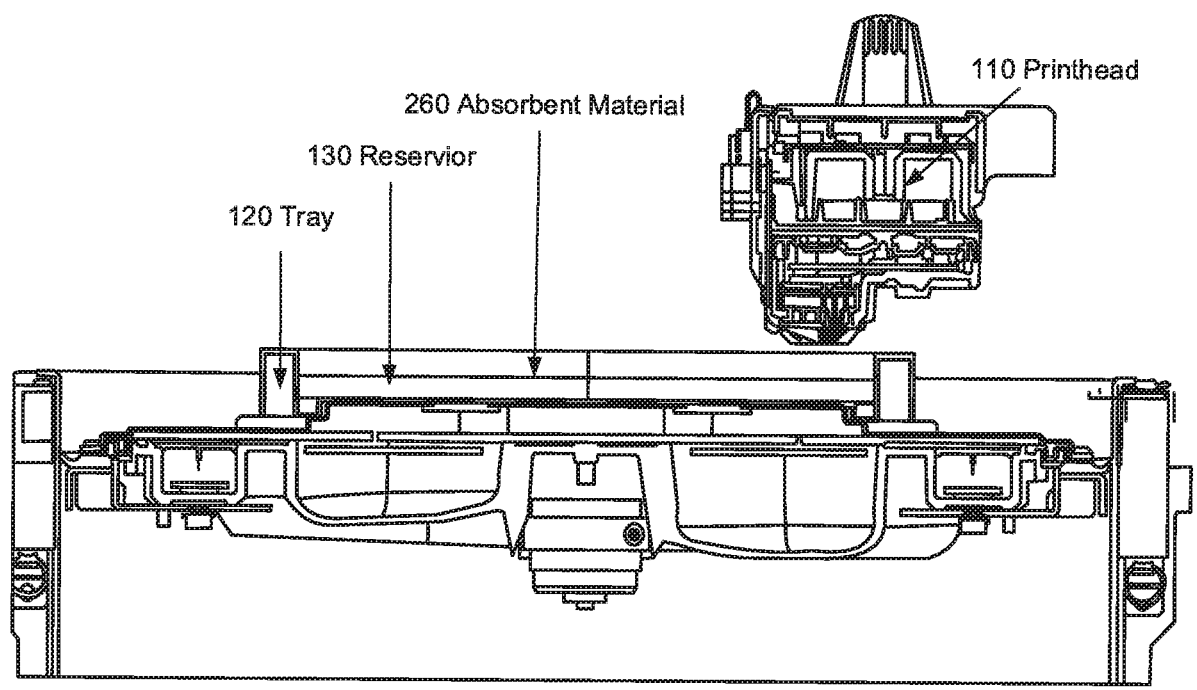
FIG. 6 is a front view of a three dimensional printing system according to an example of the principles described herein.

FIG. 6 is a front view of a three dimensional printing system (100) according to an example of the principles described herein. The printhead (110) is shown close to the absorbent material (260) in the reservoir (130) of the tray (120). As discussed above, this reduces droplets and other ejected liquid from escaping into the environment. In some examples, the printhead (110) moves with respect to the tray (120) while ejecting liquid (140) to distribute the ejected liquid (140) over a larger portion of the absorbent material (260). The absorbent material (260) may be sufficiently permeable to wick the liquid (140) away from the area of deposition into other parts of the reservoir (130).

Figure 7A:
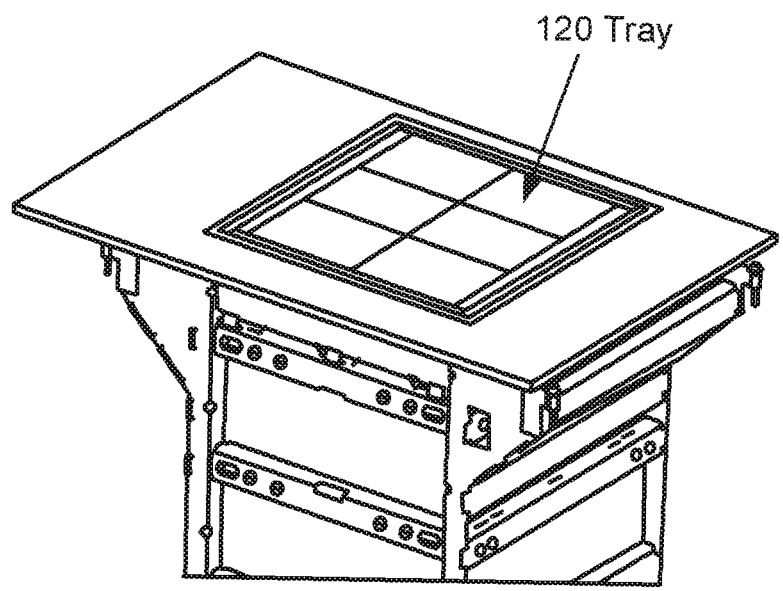
FIG. 7A is a perspective view of a tray installed in a printing bed of a three dimensional printing system according to an example of the principles described herein

FIG. 7A is a perspective view of a tray (120) installed in a build unit of a three dimensional printing system (100) according to an example of the principles described herein. The tray (120) may be mounted flush with a surrounding surface. The tray (120) may be elevated with respect to a surrounding surface. The tray (120) may be recessed relative to a surrounding surface. The tray (120) may occupy a majority of a printing bed as shown in FIG. 7A.

Figure 7B:
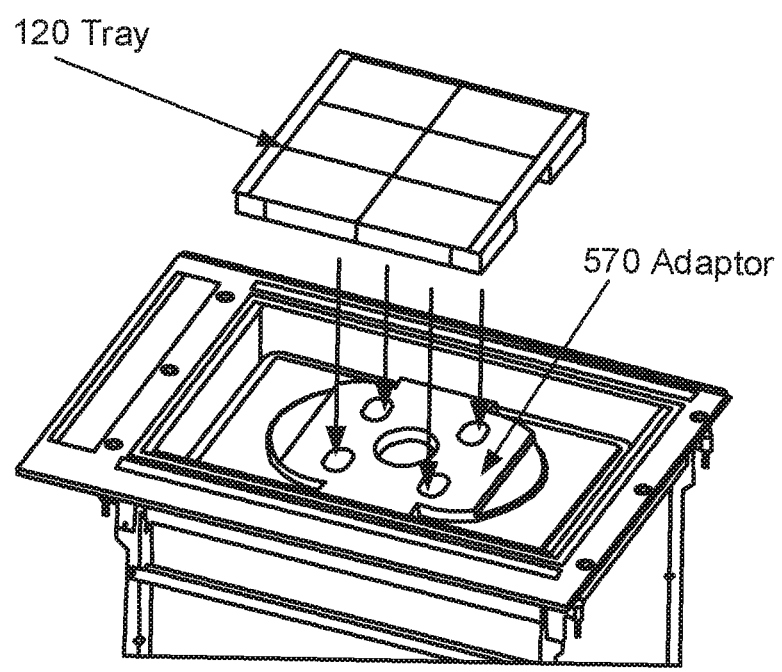
FIG. 7B is a perspective view of the installation of a tray onto an adaptor in a large printing bed of a three dimensional printing system according to an example of the principles described herein.

FIG. 7B is a perspective view of the installation of a tray (120) onto an adaptor (570) in a build unit of a three dimensional printing system (100) according to an example of the principles described herein. The adaptor (570) may provide mechanical features to guide placement of the tray (120). The adaptor may have a plurality of openings which connect with a plurality of openings monitored by a pressure sensor. The tray (120) may obstruct an opening and/or multiple openings to produce a change in pressure at the pressure sensor.

In this example, a handle for the tray (120) may be seen on the right hand side of the tray (120). The handle aids placement and/or removal of the tray (120). The tray (120) may include handles on opposite sides of the tray (120) to aid in placement and/or removal of the tray (120) from the adaptor (570) and/or print bed.

Figure 8A:
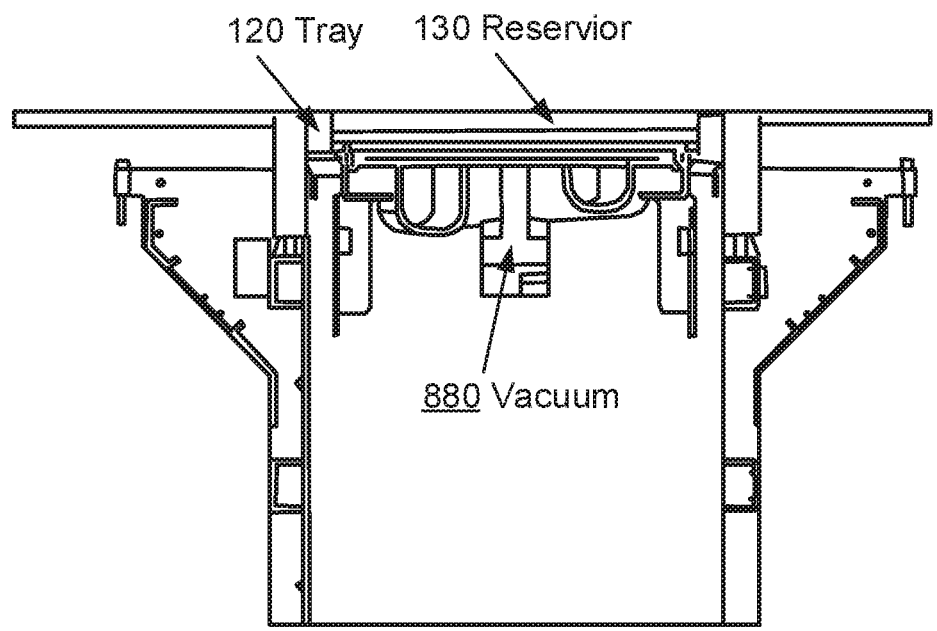
FIG. 8A is a cross-sectional diagram of a three dimensional printing system according to an example of the principles described herein.

FIG. 8A is a cross-sectional diagram of a three dimensional printing system (100) according to an example of the principles described herein. The tray (120) with the reservoir (130) is shown in a printbed of the system (100). Located under the tray (120) is a vacuum (880). The vacuum draws air from a number of inlets, including underneath the tray (120). The tray (120) obstructs an opening providing air to the vacuum (880). A pressure sensor between the obstructed opening and the vacuum (880) indicates the presence of the tray (120) over the opening.

Figure 8B:
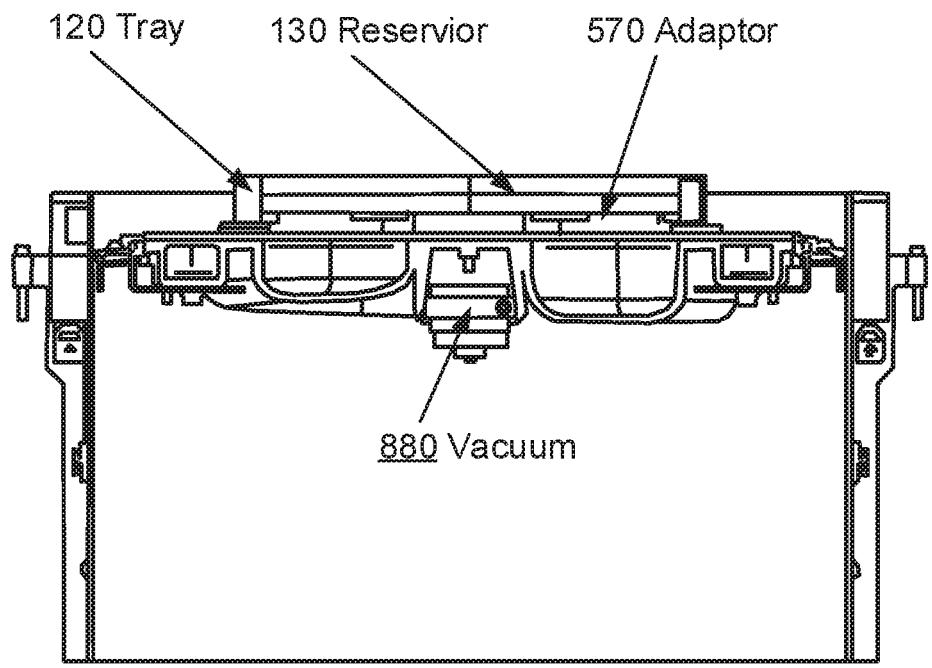
FIG. 8B is a cross-section diagram of a three dimensional printing system with a larger printing area according to an example of the principles described herein.

FIG. 8B is a cross-section diagram of a three dimensional printing system (100) with a larger printing bed accordingly to an example of the principles described herein. In addition to the tray (120) with the reservoir (130) and the vacuum (880) located underneath the tray, FIG. 8B includes an adaptor (570) between the print bed and the tray (120). In some examples, the adaptor (570 covers a plurality of openings providing air to the vacuum (880), the adaptor (570) also provides fewer openings to be covered by the tray (120). The adaptor (570) may provide an open with greater resistance, e.g., smaller diameter, to be covered by the tray (120). Thus, putting the adaptor in place produces a first pressure change between the adaptor (570) and the vacuum (880) and putting the tray (120) on the adaptor (570) produces a second, cumulative pressure change. In this manner, the system (100) can distinguish placement of the adaptor (570) from placement of both the adaptor (570) and tray (120). This information can then be used to provide user prompts and/or limit operations, e.g., liquid purging, until the tray is in place.

In some examples, the system (100) includes a plurality of openings providing air to the vacuum (880) where the different openings provide different pressure drops when individually obstructed. The pressure drop may be due to the size of the opening, a baffle between the opening and the vacuum, travel distance between the opening and the vacuum (880) and/or other factors. In some examples a plurality of pressure sensors are used to determine a position of obstructing material in front of multiple openings.

The use of the vacuum (880) with the pressure sensor to determine the placement of the tray (120) may also help hold the tray (120) in place. The vacuum (880) will produce a pressure difference across the tray (120), helping to hold the tray (120). In some examples, a large pressure differential is applied making removal of the tray (120) difficult until the system (100) has finished purging liquid (140) from the printhead (110). The system (100) may then adjust valves to change an airflow path and/or modify the draw volume of the vacuum to reduce the pressure differential holding the tray (120) in place.

Figure 9:
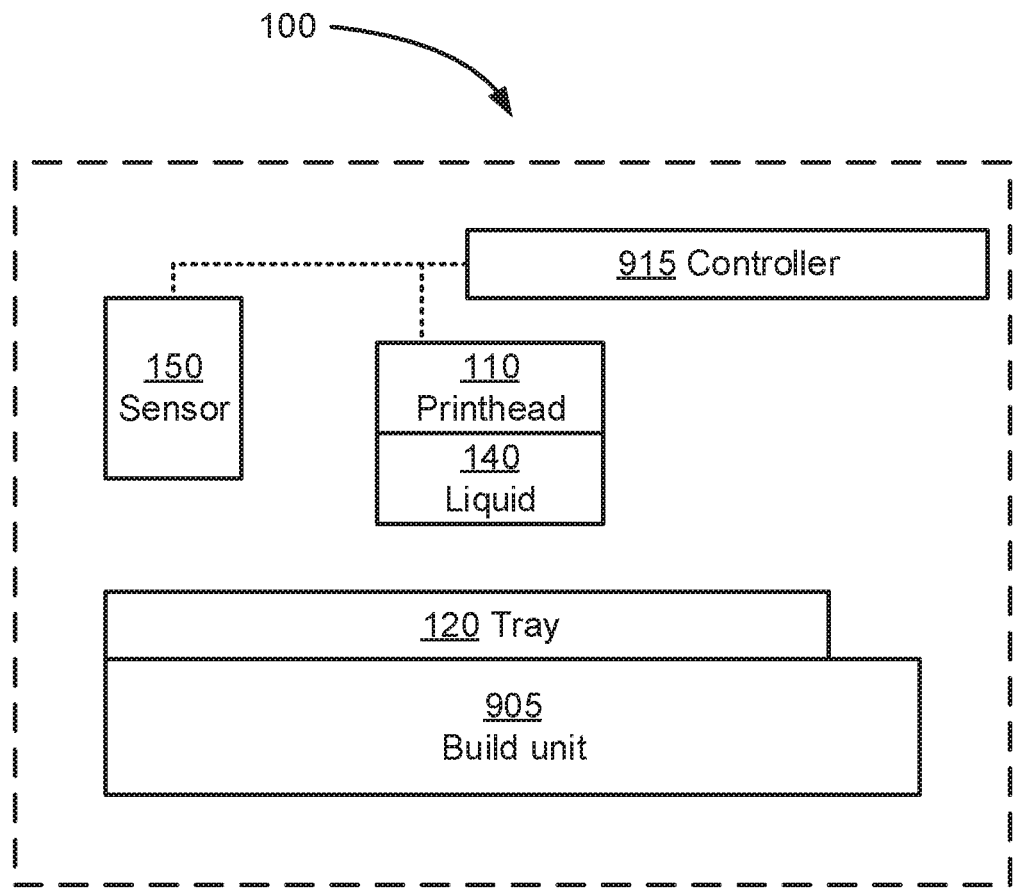
FIG. 9 is a diagram of a three dimensional printing system according to an example of the principles described herein.

FIG. 9 is a diagram of a three dimensional printing system (100) according to an example of the principles described herein. The system (100) includes: a build unit (905); a printhead (110), the printhead comprising an purgeable liquid (140) and the printhead (110) positioned so that ejected liquid (140) from the printhead (110) is deposited on the build unit (905); a sensor (150), the sensor (150) to detect placement of a tray (120) in the build unit (905); a controller (915), wherein the controller (915): detects placement of the tray (120) the build unit (905) using the sensor (150); and when the tray (120) is positioned to receive liquid (140) ejected from the printhead (110), the controller (915) causes the printhead (110) to purge liquid (140) from the printhead (110).

The build unit (905) is an area on a three dimensional printing system (100) where forming of three dimensional objects occurs. This may include a print bed, a spreader, a radiation source, a heat source, sensors (150), other components, and/or combinations thereof. Placing the tray (120) in the build unit (905) allows the tray to be placed under and area where the printhead (110) and/or printbar is already able to expel liquid (140), as this is where the printhead (110) expels liquid (140) during the build process. Since the purging of the liquid (140) from the printhead (110) can be performed between forming jobs, this area need not be in use when used to purge liquid (140) from the printhead (110). This may reduce the number of components and/or amount of code needed to provide the ability to purge liquid (140) into a tray (120).

The controller (915) provides control signals to various components of the three dimensional printing system (100). The controller (915) may receive signals from a sensor (150). The controller (915) may provide signals based on signal received from a sensor (150), The controller (915) provides signals to the printhead (110). The controller (915) may prevent a purge signal from being sent to the printhead (110) unless it has received a signal from a sensor (150) indicating the tray (120) is in place in the build unit (905). The controller (915) may send the purge signal. The controller (915) may provide a purge signal that is stopped if the sensor signal stops. The controller (915) may require stability in the sensor (150) output prior to providing the purge signal to the printhead (110). In one example, the controller requires the sensor (150) output to be stable for five seconds prior to issuing and/or allowing to issue a purge signal to the printhead (110).

The controller (915) may have an associated memory. The controller may have a bus, gateway, and/or other communication pathway to send and/or receive information from external to the system (100). In one example, the controller (915) receives printing instructions which are used by the system (100) to build objects in the build unit (905). The controller (915) may integrate information from a plurality of sources to control operation of the system (100). For example, the controller (915) may monitor signals from a power supply, a clock, various sensors, etc. and use those signals to determine which signals to provide to the system (100).

In some examples, the system (100) further comprises moving the printhead (110) before causing the printhead (110) to purge liquid (140) from the printhead (110). The printhead (110) may be centered over the tray (120), The printhead (110) may be aligned with respect to a reservoir (130) on the tray (120). The printhead (110) may move between expulsions of liquid (140) from the printhead (110). For example, the printhead (110) may move between every 10 ml of liquid being purged. The printhead (110) may move continuously and/or semi-continuously while purging liquid (140) from the printhead (140). For example, the printhead (110) may raster and/or oscillate over a reservoir (130) in the tray (120) so as to distribute the deposited liquid (140).

The controller (915) may be implemented in hardware. The controller (915) may be implemented in software. The controller (915) may be implemented as a mixture of hardware and software. The controller (915) may include an ASIC. The controller (915) may include a general purpose processor that functions as a specific machine under a set of instructions. The controller (915)

In some examples, the purgeable liquid (140) is a shipping liquid (140). The purgeable liquid (140) may be an activating agent. The purgeable liquid (140) may be a mask material. The purgeable liquid (140) may be an ink. The purgeable liquid (140) may be build material. The purgeable liquid (140) is a liquid in the printhead (110) that a user desires to remove from the printhead (110) for some purpose. By disposing of the purgeable liquid (140) into a tray (120) instead into the system (100), the liquid (140) may be purged with less demand on system (100) resources, e.g., waste storage and/or consumable use.

The preceding description has been presented to illustrate and describe examples of the principles described. This description is not intended to be exhaustive or to limit these principles to any precise form disclosed. Many modifications and variations are possible in light of the above teaching.

What is claimed is:

1. A three dimensional printing system, the system comprising:
    a printhead; and
    a removable tray comprising a reservoir, the tray located in a print bed of the three dimensional printing system such that liquid purged from the printhead is deposited in the reservoir,
    wherein prior to the system purging liquid from the printhead, the system confirms that the tray is in place using a sensor.

2. The system of claim 1, wherein the tray further comprises absorbent material in the reservoir.

3. The system of claim 2, wherein when the absorbing material is within 1.0 centimeter of an ejector of the printhead.

4. The system of claim 2, further comprising a controller programmed to receive input from the sensor indicating that the removable tray has been removed and to, in response, halt a flow of liquid to the tray from the printhead.

5. The system of claim 1, wherein the sensor is a pressure sensor, the pressure sensor detecting obstruction of an airflow path by the tray.

6. The system of claim 1, wherein the printhead is filed with a liquid which is shipping liquid.

7. The system of claim 1, further comprising an adaptor, the adaptor being larger than the tray and sized corresponding to the print bed of the system, the tray being received inside the adaptor and supported by the adaptor on the print bed of the system.

8. The system of claim 1, wherein the tray removably attaches in a printing area comprising the print bed of the three dimensional printing system such that the tray is within 1.0 cm of an ejector of the printhead.

9. The system of claim 1, wherein the reservoir has sufficient available volume to contain all liquid in two printbars filled with liquid, wherein one of the printbars comprises the printhead and each printbar comprises a plurality of printheads.

10. The system of claim 2, wherein the absorbent material is mechanically connected to an interior surface of the reservoir.

11. The system of claim 1, wherein the tray includes a portion to obstruct an opening in the print bed, such that the obstructed opening produces a change in pressure detected by the sensor, which comprises a pressure sensor.

12. The system of claim 1, wherein the liquid is a printing liquid.

13. The system of claim 1, wherein the printhead is positioned so that liquid purged from the printhead is deposited on the print bed; and
    a controller, wherein the controller:
        detects placement of the tray in the print bed using the sensor; and
        when the tray is positioned to receive liquid ejected from the printhead, the controller causes the printhead to purge liquid from the printhead.

14. The system of claim 13, further comprising, the controller programmed to move the printhead into position over the print bed before causing the printhead to purge liquid from the printhead.

15. The system of claim 13, wherein the purgeable liquid is a shipping liquid.

16. The system of claim 13, further comprising absorbent material in a reservoir of the tray.

17. The system of claim 1, wherein the sensor is a pressure sensor, the system further comprising:
    a controller; and
    an adaptor interposed between the removable tray and the print bed, the tray being removably received in the adaptor on the print bed;
    wherein the controller is programmed to distinguish, based on changes in pressure detected by the pressure sensor, when the adaptor is in place on the print bed without the removeable tray and when the removable tray is engaged in the adaptor on the print bed.

18. The system of claim 1, wherein the tray comprises mechanical features to align and stabilize the tray on the print bed.

19. The system of claim 1, the reservoir further comprising features to increase a surface area of the reservoir.

* * * * *